United States Patent [19]

Kemper

[11] 4,094,202

[45] June 13, 1978

[54] PISTON STROKE VARYING MECHANISM FOR EXPANSIBLE CHAMBER ENERGY CONVERSION MACHINES

[75] Inventor: Yves Jean Kemper, Birmingham, Mich.

[73] Assignee: Vadetec Corporation, Troy, Mich.

[21] Appl. No.: 738,704

[22] Filed: Nov. 3, 1976

[51] Int. Cl.[2] .............................................. F16H 23/00

[52] U.S. Cl. ........................................................ 74/60

[58] Field of Search ............. 74/60; 417/222; 91/504, 91/506

[56] References Cited

U.S. PATENT DOCUMENTS

| | | | |
|---|---|---|---|
| 1,346,672 | 7/1920 | Patton | 74/60 |
| 3,319,874 | 5/1967 | Welsh et al. | 74/60 |
| 3,356,080 | 12/1967 | Howard | 74/60 |
| 3,418,941 | 12/1968 | Mowbray | 91/506 |
| 3,508,401 | 4/1970 | Aplin | 91/506 |

*Primary Examiner*—Benjamin W. Wyche
*Assistant Examiner*—Wesley S. Ratliff, Jr.
*Attorney, Agent, or Firm*—Lane, Aitken, Dunner & Ziems

[57] ABSTRACT

An expansible chamber energy conversion machine, such as an internal combustion engine, in which one or more reciprocating pistons drivably revolve a nutating member about an output torque delivery shaft in a manner to enable variation in piston stroke distance. The nutating member forms part of a variable speed ratio transmission and is adjustably supported on an axis inclined to the output shaft by an eccentric sleeve rotatable with respect to a support rotatable on the shaft axis. Piston reciprocation is translated to the nutating member by way of arm-like extensions of the nutating member and swivel links.

13 Claims, 5 Drawing Figures

56
54
32
52
10
42
44
46
45
48
118
112
43
128
116
36
16
86
18
20
28
80
38
2
114
84
12
26
14
24
122
S
ΔS
120
28
66
62
88
90
84
120
92
40
82
60
94
36
64
106
102
110
58
a
96
100
108
103
104
30
34 d
$C_1$
$C_2$
$C_3$
$D_1$
$D_2$
$D_3$
$\Delta d$
$S_3$
$S_2$
$S_1$
$a_3$
$a_2$
$a_1$
y
Z
16
$B_3$
$B_2$
$B_1$
x $Z_b$
$t_b$
$Z_a$
$B_a$
$t_a$
16
16
B
$X_a$
$X_b$

PISTON STROKE VARYING MECHANISM FOR EXPANSIBLE CHAMBER ENERGY CONVERSION MACHINES

BACKGROUND OF THE INVENTION

This invention relates to expansible chamber energy conversion machines and more particularly, it concerns a novel apparatus for varying the stroke of a reciprocable piston in such machines with or without substantial variation in the volumetric ratio of the expansible chamber defined in part by the piston.

Expansible chamber energy conversion machines typically include Otto or Diesel cycle internal combustion engines, heat engines in which fuel is burned externally, such as steam engines and Stirling engines, air motors, as well as machines which operate to transform mechanical energy to fluid and/or thermal energy, such as compressors and pumps. In all such machines, operating efficiency is optimized when the work performed in the expansible chamber is correlated with the load demand for converted energy. Where the energy conversion requirements are widely variable therefore, variation in the volumetric capacity of the expansible chamber is significant in the attainment of optimum efficiency under all operating conditions.

It is known that the thermal efficiency of a conventional automotive internal combustion engine, for example, progresses to a near maximum level at about 30% of the rated maximum horsepower of the engine but decreases rapidly with a decrease of power output. Normal power requirements of an automotive engine, however, are most often less than maximum engine capacity with the result that average efficiency over the life of the engine is much lower than optimum. Attempts have been made in the past to permit variation of power capacity in automotive engines by varying the piston stroke or displacement to achieve maximum thermal efficiency under varying power output requirements. Difficulties have been encountered, however, not only in the achievement of a satisfactory mechanical arrangement for varying the length of piston stroke, but also in maintaining the compression ratio of the engine within a range which is acceptable for combustion of a fuel with a given octane rating and from the standpoint of maintaining a constant maximum temperature of the thermal cycle.

Another example of the need for a variable piston stroke in internal combustion engines has been recognized in diesel engines. Diesel engines typically employ relatively high compression ratios which contribute to difficulties both in engine starting and in loss of efficiency at high speed operation. The problems associated with starting an engine having a high compression ratio are manifested by the starting torque required to perform the work necessary to overcome the compression of gas in the combustion chambers of the engine. During high speed operation of diesel engines, typically high compression ratios result in mechanical friction losses of such magnitudes as to detract materially from overall engine efficiency at such speeds.

In engines of the type which convert thermal energy derived from combustion of fuel externally of the expansible working chamber defined in part by piston connected with a rotary shaft, such as the Stirling engine, for example, the provision of a variable piston stroke may be used advantageously to control the output power of the engine. Such engines now employ complex working fluid control systems to this end. Also the B.T.U. output of refrigeration compressors, for example, may be advantageously correlated with load demands by changing the length of the piston stroke in a manner to reduce or increase the fluid displacement for each complete cycle of operation. While the many advantages of varying the stroke of a piston in an expansible chamber energy conversion machine have long been recognized, the difficulties experienced in the attainment of an acceptable mechanical system by which a rotary shaft movement can effectively be transmitted to piston reciprocation, or vice versa, has been a deterent to realization of these advantages.

In a co-pending application for U.S. patent, Ser. No. 706,291, filed July 19, 1976, by the present inventor, various embodiments of internal combustion and Stirling engines are disclosed in which a plurality of pistons are positioned for reciprocation on axes spaced equidistantly and parallel to a central output shaft to which output torque is transmitted by a novel variable speed transmission. Essentially, the transmission includes a pair of axially adjustable, oppositely inclined, conical rolling surface defining members keyed on the output shaft and frictionally engaged at two points of contact by axially adjustable ring-like members carried by a nutating cylindrical member disposed on an axis inclined with respect to output shaft axis. The pistons are connected to the nutating member and synchronized in operation such that the axis of the nutating member develops a bi-conical orbital path about the output shaft. Speed variation is attained by relative axial adjustment of the shaft carried conical rolling surfaces with respect to the ring-like elements on the nutating member to vary the effective diameter of the respective frictionally engaged surfaces. This organization results in an extremely well-balanced, simplified and highly effective arrangement by which the reciprocation of pistons developed by thermal energy may be transmitted to a variable speed, rotary output shaft.

SUMMARY OF THE PRESENT INVENTION

In accordance with the present invention, an expansible chamber energy conversion machine, represented for example by an internal combustion engine of the type disclosed in the aforementioned co-pending application, is provided with a variable piston stroke simply by providing for variation in the angle between a revolving nutational axis and an output shaft axis in such engines where piston movement is transmitted to output shaft rotation or torque by a piston connected nutating member which transmits torque to the output shaft by frictional engagement therewith. In such machines, the thrust of piston reciprocation, whether driving or driven, is transmitted to or from the nutating member through a swiveling compression link having one end pivotal freely or universally about a fixed point and another end moveable with the nutating member in a circular path correlated to the nutational orbit of the nutating member. The axis of the link will, therefore, generate a cone with the one end at the cone apex and the other end or base of the cone coincident with the aforementioned circular path. Although the length of the link axis will be fixed in any given machine, the height of the generated cone will vary with the diameter of the base. The geometry of the linkage interconnecting the pistons and the nutating member is determined, in accordance with the present invention, such that piston stroke distance is correlated with the diameter of the link generated cone base whereas the locus of piston stroke, specifically the top-dead-center position thereof relative to a cylinder head or cylinder end face defining a working chamber with the piston, is determined by the height of the link generated cone. By selection of various other geometric parameters in a given machine design, piston stroke variation may be correlated to piston clearance at the top-dead-center position thereof to achieve either a constant compression ratio or a variable compression ratio.

The angle between the nutational axis and the shaft axis is adjusted by relative rotation of an eccentric sleeve and a rotating external support for the nutating member, the sleeve being positioned radially between the support and the nutating member. Such relative rotation is effected for example, by annular fluid chambers between the sleeve and the support and which operate to enlarge or contract, in terms of arc length, by the introduction and withdrawal of pressurized fluid to and from the annular chambers. The transmission speed ratio is controlled independently of the angular disposition of the nutational axis by axially shiftable shaft-carried conical members and ring-like elements supported by the nutating member.

Among the objects of the present invention are therefore: the provision of an expansible chamber energy conversion machine having a capability for varying piston stroke length with or without modification of working chamber volumetric ratio; the provision of such a machine in which the number of working parts is minimized; the provision of such a machine in which the manufacture of working parts is simplified; the provision of such an expansible chamber energy conversion machine in which the length of piston stroke is very simply and effectively controlled with precision; the provision of such a machine where speed of input-output torque shaft rotation may be controlled independently of piston stroke.

Other objects and further scope of applicability of the present invention will become apparent from the detailed description to follow taken in conjunction with the attached drawings in which like parts are designated by like reference numerals.

DETAILED DESCRIPTION OF THE PREFERRED EMBODIMENT

Figure 1:
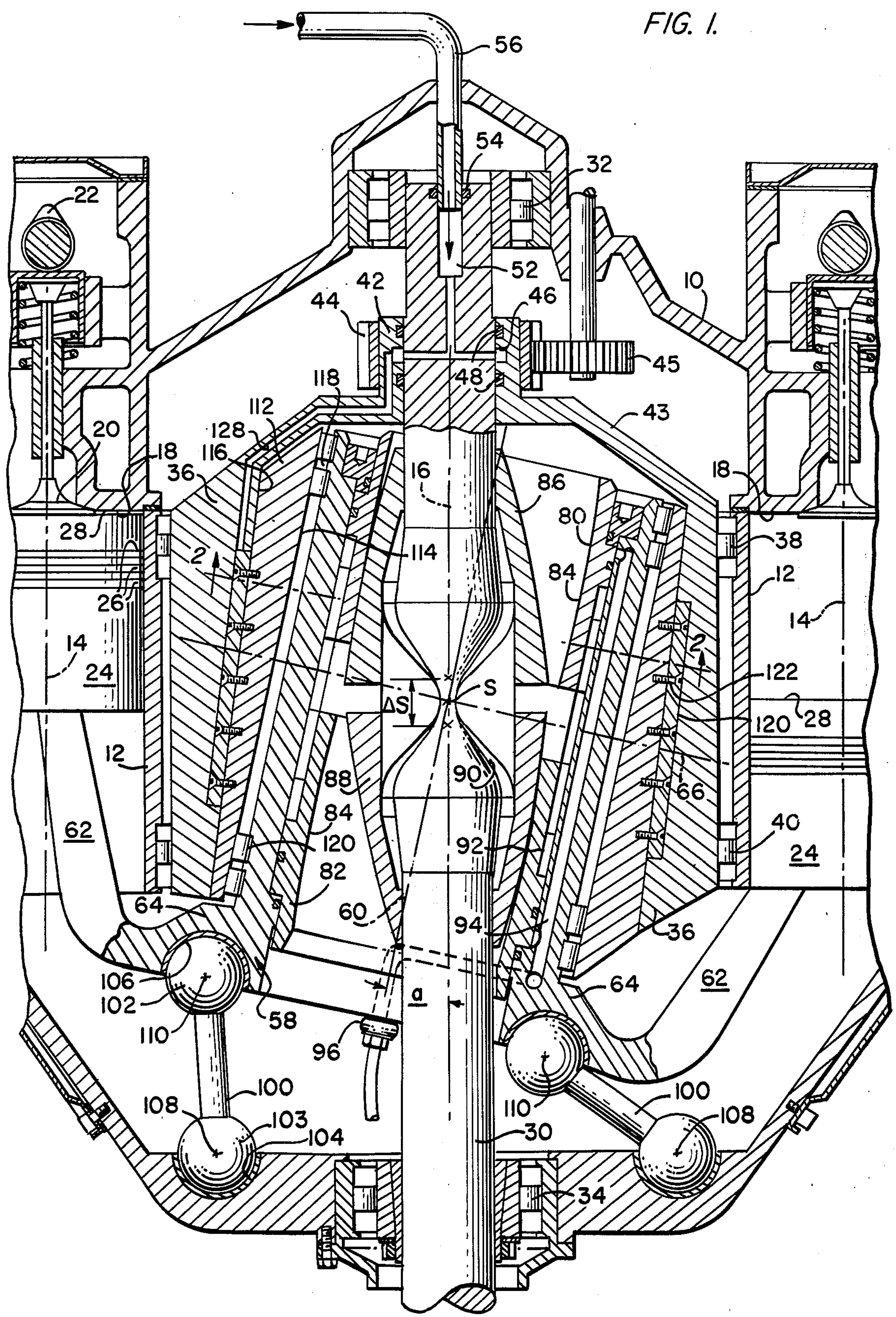
FIG. 1 is a longitudinal cross-section through an internal combustion engine incorporating the variable stroke mechanism of the present invention.
Figure 2:
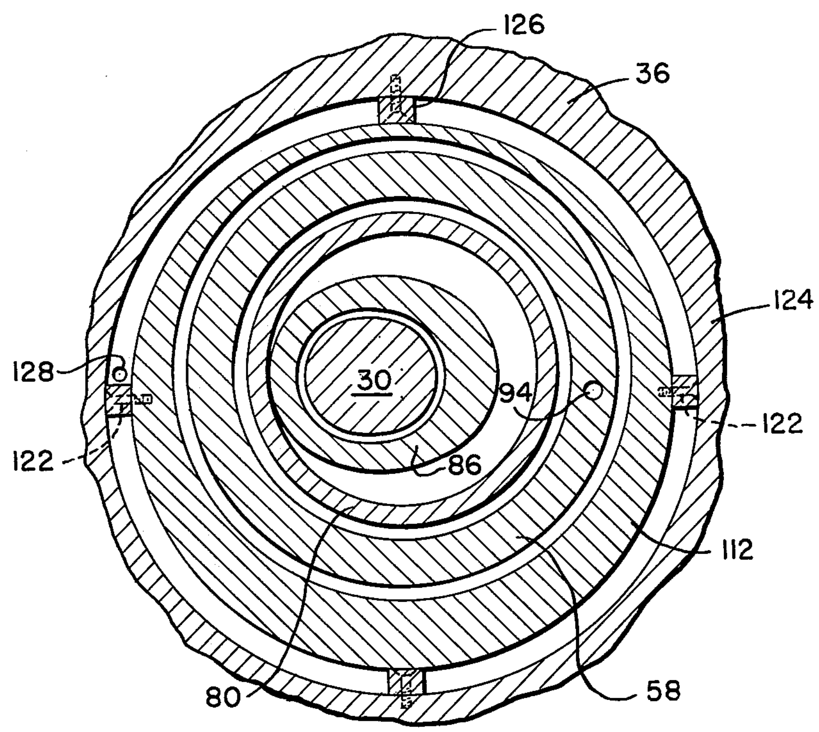
FIG. 2 is a cross-section on line 2—2 of FIG. 1.
Figure 3:
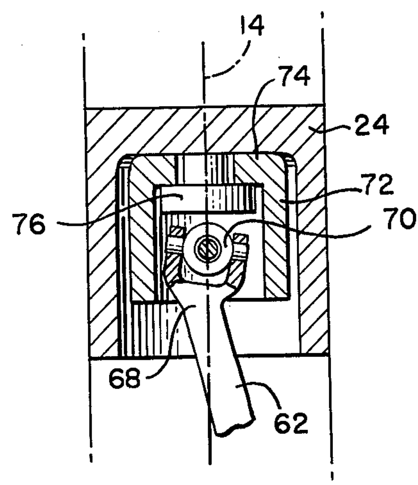
FIG. 3 is a fragmentary cross-section through one of the pistons of the engine shown in FIG. 1.

In FIGS. 1–3 of the drawings, an expansible chamber energy conversion machine incorporating the present invention is embodied in an internal combustion engine of the type which operates in accordance with the well known Otto cycle. The engine illustrated is similar to the disclosure of the aforementioned co-pending application Ser. No. 706,291 and as such, includes a frame 10 defining a plurality of cylinders 12 on axes 14 symmetrically disposed in circular fashion about a central engine axis 16. The axes 14 of the cylinders 12 are therefore spaced equidistantly from the axis 16 and in the disclosed embodiment, are parallel to the central axis 16.

Each of the cylinders 12 terminates in an end face 18 in which conventional intake and exhaust valves 20, for example, may be seated and operated between seated or closed and unseated or opened conditions by synchronously rotated cams 22. Positioned in each cylinder 12 for reciprocation therein along the respective axes 14 is a piston 24 having the usual external ring seals 26 to engage the inner surface of the cylinder 12 in fluid tight relation. In conventional fashion, each of the pistons 24 terminates in an end face 28 defining with the cylinder end face 18 and expansible chamber having a volume which will vary in accordance with the reciprocable stroke distance of piston movement along the axis 14.

A torque transmitting member or output shaft 30, in the internal combustion engine illustrated, is supported by the frame 10 through bearings 32 and 34 for rotation on the axis 16. While the bearings 32 and 34 may be of a design different from that illustrated in FIG. 1 of the drawings, for example, it is important for reasons which will be described in more detail below that the bearings 32 and 34 provide not only for rotation of the shaft 30 about the axis 16 but also for axial movement of the shaft 30 with respect to the frame 10. Thus, in the disclosed embodiment, the bearings are depicted as cylindrical rollers capable of permitting relative axial movement of the respective inner and outer races in which the rollers are contained.

Also supported by the frame 10 for rotation about the axis is an externally cylindrical support member 36. The support member 36 is journaled in the frame 10 by roller bearings 38 and 40 again of a design to permit relative axial movement of the support 36 and the frame 10. The support member 36 is also rotatable relative to the shaft 30 and is in rotary engagement therewith by a sleeve 42 illustrated as an integral cylindrical extension of an end plate or spider 43. A gear 44 is splined to the sleeve 42 and meshes with a piston 45 forming part of a timing system (not shown) for operation of the cams 22 and other auxiliary engine components known in the art.

The sleeve 42 is provided with an internal annular chamber 46 situated axially between a pair of running seals 48 and in communication with radial bores 50 in the shaft 30. The radial bores 50 communicate with an axial counter-bore 52 in the shaft in fluid communication by a running telescopic seal 54 with a tube 56 mounted in the end of the frame 10. Thus it will be appreciated that a control fluid may be introduced or withdrawn through the tube 56 and the annular chamber 46 irrespective of limited axial movement of the counter-bore 52 and the tube 56.

In accordance with the disclosure of the aforementioned co-pending application Ser. No. 706,291, the support member 36 carries a nutatable cylindrical member, generally designated by the reference number 58, and having a longitudinal axis 60 which intersects the axis 16 at a point of intersection S and at an angle *a*. The nutatable member 58 supports arm-like extensions 62 of generally bell-crank configuration joined integrally at one end 64 at which they join with the end of the nutatable member 58, back to a plane 66 passing through the point of axes intersection and perpendicular to the axis 60. The configuration of the arms is such that the projecting ends 68 thereof lying in the plane 66 are located approximately on the axes 14 of the cylinders 12.

As shown in FIG. 3, the projecting end 68 of each arm 62 is connected to an associated piston 24 pivotally through a universal joint 70 having fulcrum point lying in the plane 66. Although the fulcrum point of the universal joint 70 is also located approximately on the axis 14 of the cylinder 12, for reasons which will become apparent from the description following below, the joint 70 will not always be centered on the axis 14 during reciprocation of the pistons 25. Accordingly, the joint connects the extending end 68 of the arm 62 to a sleeve 72 capable of transverse sliding movement with respect to the piston 24 but axially movable therewith as a result of sliding engagement of an end portion 74 under a depending headlike boss member 76 on the piston. In light of the organization shown in FIG. 3 it will be appreciated that movement of the piston 24 along the axis 14 will be accompanied by an equal axial component of movement by the universal joint. The joint 70, however, may also undergo transverse movement independently of the piston 24.

Although the transmission of torque to the shaft 30 by the nutating member 58 is fully described in the aforementioned copending application Ser. No. 706,291, the basic operating components of the transmission thus constituted will be summarized here in the interest of a complete understanding of the present invention. In particular, the cylindrical nutating member 58 carries a pair of axially movable ring or sleeve like members 80 and 82 each having an interior friction surface 84 to engage one of two generally conical members 86 and 88 supported for rotation with the shaft 30 but axially movable thereon relative to the point S. Axial separation of the conical members 86 and 88 in proportion to the torque transmitted by the shaft 30 is effected by a system helical ramps 90 described in the aforementioned copending application. The members 80 and 82 frictionally engage the conical members 86 and 88 at two points spaced equidistantly from the point S and are relatively movable to vary the ratio of the diameter of the conical members 86 and 88 and of the diameter of the inner surfaces 84 of the nutating member carried rings 80 and 82 to effect a variable speed torque transmission. The speed desired is controlled by axial movement of the members 80 and 82 along the axis 60 by fluid chambers 92 supplied with a control fluid through ports 94 communicating with a coupling 96 positioned on the end of the nutatable member 58.

As explained in the aforementioned co-pending application, nutating movement of the member 58 such that the axis 60 is caused to revolve about the axis 16 in biconical fashion, results in rotation of the shaft 30. Also it will be appreciated that such nutational movement of the member 58 may be effected by appropriate synchronization of the pistons 24 in accordance with well-known internal combustion engine operation as a result of the connection of the pistons to the member 58 by the arms 62.

To absorb the thrust of the pistons 24, swivel means in the form of compression links 100 extend between the frame 10 and the juncture 64 of the arms 62 with the nutating member 58. As shown in FIG. 1, for example, the links 100 are each provided with a spherical ball 102 and 103 at opposite ends engagable for swiveling movement with respect to the frame in sockets 106 at the end of the nutating member 58. In light of this organization of the links 100, it will be appreciated that the ball 103 of each link 100 will swivel on a fixed fulcrum 108 whereas the ball 102, in addition to swiveling in the socket 106, will travel such that the center 110 thereof defines a generally circular path corresponding to the nutational orbiting motion of the axis 60 about the axis 16.

In accordance with an important feature of the present invention, the stroke distance of piston travel along the axes 14 may be varied by changing the angle $a$ made by the axes 16 and 60 of the shaft 30 and nutating member 58, respectively. To this end, an eccentric sleeve 112 having inner and outer cylindrical surfaces 114 and 116 is positioned between bearings 118 and 120 supporting the nutating member 58 and the rotatable support member 36. The sleeve 112 is eccentric in the sense that the axes of the respective inner and outer cylindrical surfaces 114 and 116 are inclined relative to one another and intersect at the point S. The surfaces 114 and 116 are therefore eccentric with respect to each other except in a transverse plane coincident with the plane 66 intersecting point S. Also it will be seen that rotation of the sleeve 112 relative to the support 36 will operate to change the inclination of the axis 60 and correspondingly vary the angle $a$.

To control angular adjustment of the sleeve 112 with respect to the support 36, a pair of vane strips 120 are secured by screws 122 or other suitable means along the outer cylindrical surface 116 of the member 112 to span the radial distance of an annular chamber 124 (FIG. 2) in the support member 36. A similar pair of vane strips 126 are secured to the support member 36 to define in the annular chamber, isolated arc-lengths which are variable upon relative rotation between the sleeve 112 and the support member 36. Such relative rotation may be effectively controlled by a control fluid fed through the tube 56, and the annular channel 46 and through a passageway 128 in the support 36. Although one passageway 128 is shown, additional passageways could be provided for the introduction and withdrawal of control fluid to and from the sectors of the annular chamber 124 in a manner to adjustably rotate the sleeve 112 relative to the support 36.

Figure 4:
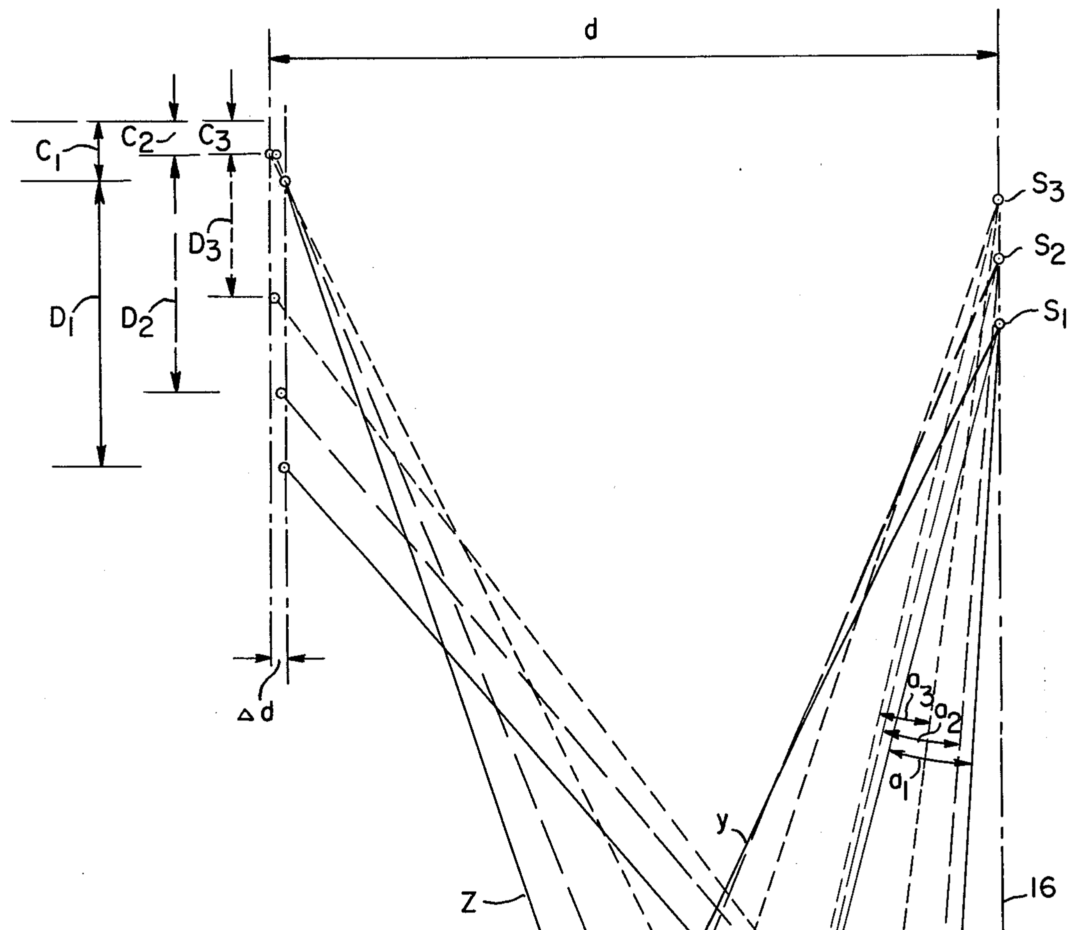
FIG. 4 is a schematic diagram in which components shown in FIG. 1 are depicted in line form to illustrate the operating principles of the present invention.

The manner in which the structural organization thus shown in FIGS. 1–3 operates to vary the stroke distance of the pistons 24 may be understood by reference to FIG. 4 of the drawings. Although the operation of only one piston 24 is depicted in FIG. 4, it will be appreciated that the same principles apply to all of the pistons employed in the engine, preferably three or more. In FIG. 4, piston operations for three values of the angle $a$ are designated respectively $a_1$, $a_2$, and $a_3$. Where the angle between the axes 16 and 60 is adjusted to the angle $a_1$, which is the largest of the three angles depicted, nutation of the member 58 will cause the compression link 100 to swivel about the point 108 such that the longitudinal axis thereof between the swivel points 108 and 110 defines a cone having a generally circular base $B_1$, the vertical axis of such cone intersecting the point of axes intersection $S_1$. As the point 110 travels in a generally circular path defined by the base $B_1$, the universal joint 70, connecting the extending end of the arm 62 with the piston, will cause the piston to travel through a stroke distance designated $D_1$ in FIG. 4. Movement of the top face of the piston 28 will terminate at a point spaced from the end face 18 of the cylinder by distance designated $C_1$ in this figure.

Where the angle between the axes 16 and 60 is reduced to the angle $a_2$ in FIG. 4, the apex angle of the cone defined by the links 100 is decreased with a coresponding reduction in the diameter of the base $B_2$. The circular path defined by the end point 110 of the link 100 will operate to advance the universal joint 70 and piston 24 through a stroke distance $D_2$. Similarly, a further reduction of the angle of first and second axes intersection to the angle $a_3$ will affect a stroke distance $D_3$.

It will also be noted that because the base $B_2$ is advanced toward the point of axes intersection $S_1$ from the circular base $B_1$, the point $S_1$ will shift through the point $S_2$ to the point $S_3$ upon a change of the angle from $a_1$ to $a_3$. This shifting of the point of axes intersection is accomodated in accordance with the present invention by the axially shiftable bearings 32, 34, 38 and 40 supporting the shaft 30 and the support member 36, respectively.

Because the arms 62 are in a fixed angular relation to the nutating member 58, movement of the universal joints will be on an arcuate path which will deviate from the axis 14 by a minimum distance $\Delta d$. This deviation will be accomodated by the connection of the joint 70 to the piston 24 as described above with reference to FIG. 3.

In the operation of an internal combustion engine having the geometric parameters represented in FIG. 4 of the drawings, it will be noted that as the angle of axes intersection varies from the angle $a_1$ to the angle $a_2$, the piston stroke length will change from $D_1$ to $D_2$ with a corresponding proportional change in the clearance distance from $C_1$ to $C_2$. Accordingly, the range of piston stroke length variation between $D_1$ and $D_2$ will occur at an essentially constant compression ratio. As the angle of axes intersection is reduced to the angle $a_3$, however, the reduction of piston stroke length to $D_3$ is not accompanied by a proportional reduction in the clearance distance $C_3$. Hence the compression ratio is reduced in the range of piston stroke length provided by a variation of the angle between $a_2$ and $a_3$. The maximum variation in the angle of axes intersection will, of course, be determined by the throw of the eccentric sleeve 114, one of several geometric design parameters available for the selection of operation characteristics.

It is contemplated that expansible chamber machines incorporating the present invention may be designed with varying operating characteristics determined by several other geometric parameters of such components as the frame 10, pistons 24, the nutating member 58 and the piston-nutating member interconnecting linkage represented in part by the arm 62 and the links 100. Such parameters which may be selected to determine the stroke length and top-dead-center position of the pistons for a given angle *a* could include, for example, the radial distance *d* between the axis 16 and the axis of piston reciprocation 14; the length of the nutating member 58 and correspondingly, the distance *y* between the point S and the point 100; the length of the arm 62 which is determinative of the distance *z* between the point 100 and the joint 70 the distance *x* defining the position of the point 108 between the axes 14 and 16; and the axial length of the links 100 between points 108 and 110.

Figure 5:
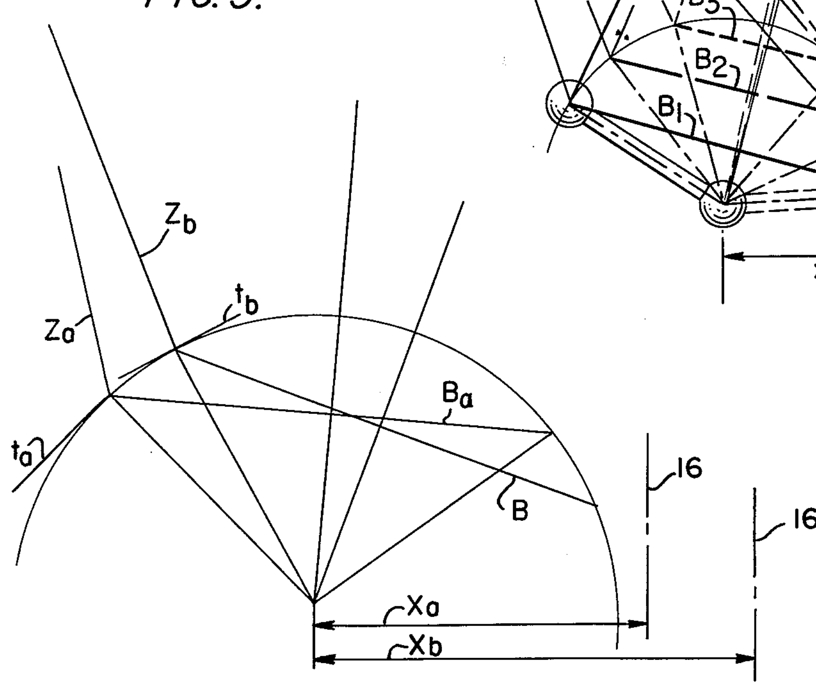
FIG. 5 is a schematic diagram including an enlarged portion of the diagram of FIG. 4 and illustrating the effect of modified geometric parameters of machine linkage.

By way of example and as illustrated in FIG. 5, it will be seen that by changing the position of the links 100 between axes 14 and 16 (change of the distance $x_a$ to $x_b$) the slope of a tangent line $t_a$ intersecting the point 110 perpendicular to the axis of the link 100 decreases to $t_b$ without change in the diameter B, it being assumed that the distance *z* and *y* are modified appropriately. Thus, in a machine where the point 108 is spaced from the axis 16 by a distance $x_a$, the variation in the top-dead-center position of the piston will be larger for a corresponding variation in piston stroke than in a machine with a distance *xb*. Conversely, a combined spacing of the link 100 relatively close to the axis 16 with a range of values for the angle *a* similar to that represented in FIG. 4 at the angle $a_3$ will effect variation in piston stroke length with a variation in top-dead-center position such that compression ratio is reduced with reduced piston stroke length. It will be understood, therefore, that it is possible in an expansible chamber machine incorporating the present invention for piston stroke length to be adjusted either without material change in compression ratio or with varying degrees of compression ratio variation with respective changes in piston stoke length.

Thus it will be seen that by this invention there is provided an improved variable stroke mechanism for expansible chamber energy conversion machines by which the above-mentioned objectives are completely fulfilled. Although the invention has been disclosed with reference to an Otto cycle internal combustion engine, it will be appreciated by those skilled in the art that the invention will have application equally to other forms of expansible chamber devices mentioned. Also it will be apparent to those skilled in the art that various modifications and or changes may be made in the disclosed embodiment without departure from the inventive concept manifested thereby. It is expressely intended, therefore, that the foregoing description is illustrative only, not limiting, and that the true spirit and scope of the present invention be determined by reference to the appended claims.

I claim:

1. An expansible chamber energy conversion machine comprising:

a frame;

a torque transmitting member supported by said frame for rotation about a first axis;

means including a piston to define a working fluid chamber on said frame, said piston being reciprocable on a second axis through a stroke distance to establish relatively large and small chamber volumes, said chamber having an end face fixed relative to said frame and spaced from said piston by a clearance distance when said piston is positioned to establish said small chamber volume;

transmission means drivably interconnecting said piston and said torque transmitting member, said transmission means including a nutatable member having a third axis intersecting said first axis at an angle to establish a point of axes intersection, said third axis being revolvable about said first axis, and extension means having one end connected to said nutating member and another end connected to said piston; and means for modifying said angle of first and third axes intersection to vary the stroke distance of said piston and to shift the locus of piston reciprocation for controlling said clearance distance in accordance with selected working chamber operating parameters, said last mentioned means comprising swivel means movable with said nutating member in a generally circular path about a fourth axis intersecting said point of axes intersection, the diameter of said path in a plane containing said first and second axes being proportional to the stroke distance of said piston.

2. The apparatus recited in claim 1 including means to adjust the locus of the plane of said path in a direction having a component of movement parallel to said second axis concurrently with adjustment in the diameter of said path in said plane, whereby the position of piston reciprocation is shifted to regulate the ratio of said large and small volumes with varying piston stroke distance.

3. The apparatus recited in claim 1 wherein said swivel means comprises a link having one end swiveled at a point on said frame and another end swiveled in said nutating member to move in said circle.

4. The apparatus recited in claim 3 wherein a longitudinal axis interconnecting the ends of said link revolves about said fourth axis as the generatrix of a cone having said path as the base thereof, and wherein the slope of said cone is variable with the diameter of said path in said plane.

5. The apparatus recited in claim 4 wherein said nutatable member is slidable along said first axis to shift said point of axes intersection in accordance with variations in the slope of said cone.

6. An expansible chamber energy conversion machine comprising:

a frame;

a torque transmitting member supported by said frame for rotation about a first axis;

means including a piston to define a working fluid chamber on said frame, said piston being reciprocable on a second axis through a stroke distance to establish relatively large and small chamber volumes, said chamber having an end face fixed relative to said frame and spaced from said piston by a clearance distance when said piston is positioned to establish said small chamber volume;

transmission means drivably interconnecting said piston and said torque transmitting member, said transmission means including a nutatable member having a third axis intersecting said first axis at an angle to establish a point of axis intersection, said third axis being revolvable about said first axis, and extension means having one end connected to said nutating member and another end connected to said piston; and means for modifying said angle of first and third axes intersection to vary the stroke distance of said piston and to shift the locus of piston reciprocation for controlling said clearance distance in accordance with selected working chamber operating parameters, said means for modifying said angle of first and third axes intersection comprising a support rotatable on said first axis, eccentric sleeve means to carry said nutating member from said support on said third axis, said support and said sleeve means being independently rotatable relative to each other and to said nutating member.

7. The apparatus recited in claim 6 including fluid control means for rotatably adjusting said eccentric sleeve means relative to said support.

8. The apparatus recited in claim 7 wherein said fluid control means comprises at least one annular chamber between said sleeve means and said support, the arc length of said annular chamber being adjustable by introduction and withdrawal of fluid into and out of said annular chamber.

9. An expansible chamber energy conversion machine comprising:

a frame;

a torque transmitting member supported by said frame frame for rotation about a first axis;

means including a piston to define a working fluid chamber on said frame, said piston being reciprocable on a second axis through a stroke distance to establish relatively large and small chamber volumes, said chamber having an end face fixed relative to said frame and spaced from said piston by a clearance distance when said piston is positioned to establish said small chamber volume;

transmission means drivably interconnecting said piston and said torque transmitting member, said transmission means including a nutatable member having a third axis intersecting said first axis at an angle to establish a point of axes intersection, said third axis being revolvable about said first axis, and extension means having one end connected to said nutating member and another end connected to said piston; and means for modifying said angle of first and third axes intersection to vary the stroke distance of said piston and to shift the locus of piston reciprocation for controlling said clearance distance in accordance with selected working chamber operating parameters, said transmission means including rolling surfaces on said torque transmitting member and on said nutating member, respectively, said rolling surfaces being frictionally engaged to transmit torque between said members and means to vary the speed ratio of said torque transmitting member and said nutating member independent of said piston stroke distance.

10. The apparatus recited in claim wherein the rolling surfaces on said nutating member engage the rolling surfaces on said torque transmitting on diametrically opposite sides of said first axis and at points spaced equally from said point of axes intersection.

11. In an internal combustion engine having an output shaft support by a frame for rotation on a first axis, at least one piston in a cylinder having an end face and reciprocable on a second axis through a stroke distance related to the power output capacity of the engine, and transmission means drivably interconnecting the output shaft and the piston, the transmission means including a nutatable member having a third axis intersecting the first axis at a point of axes intersection and revolvable about the first axis, and an arm-like extension interconnecting the piston and nutating member, the improvement comprising:

means for varying the stroke distance of said piston while maintaining substantially constant, the compression ratio of the engine and comprising means for changing the angle of the first and third axis intersection and swivel means movable with the nutating member and the extension in a generally circular path about a fourth axis intersecting said point of axes intersection and inclined with respect to second axis.

12. The improvement recited in claim 11 wherein said swivel means comprises a link having one end swiveled at a point on said fourth axis and another end swiveled in the nutating member, the longitudinal axis of said link defining a cone with said generally circular path establishing the base thereof, the slope of said cone being variable with the diameter of said path in a plane containing the first and second axes from a position in which a side of said cone facing said second axis is parallel to said second axis for the smallest effective diameter of said circle and correspondingly, the shortest piston stroke distance.

13. The improvement recited in claim 12 wherein said point on said fourth axis is fixed relative to the cylinder end face, whereby the clearance distance between said piston varies with piston stroke distance variation to maintain a constant compression ratio.

* * * * *

UNITED STATES PATENT AND TRADEMARK OFFICE

CERTIFICATE OF CORRECTION

PATENT NO. : 4,094,202

DATED : June 13, 1978

INVENTOR(S) : Yves Jean Kemper

It is certified that error appears in the above-identified patent and that said Letters Patent are hereby corrected as shown below:

In Column 10, line 3 (claim 9), the word "frame" (first occurrence) should be deleted.

In Column 10, line 34 (Claim 10), the numeral --9-- should be inserted after the word "claim".

Signed and Sealed this

*Fourteenth* Day of *November 1978*

[SEAL]

*Attest:*

RUTH C. MASON
*Attesting Officer*

DONALD W. BANNER
*Commissioner of Patents and Trademarks*